A. W. SLAYTON.
Cutter-Head.

No. 161,287.  Patented March 23, 1875.

UNITED STATES PATENT OFFICE.

AUGUSTUS W. SLAYTON, OF TECUMSEH, MICHIGAN.

IMPROVEMENT IN CUTTER-HEADS.

Specification forming part of Letters Patent No. 161,287, dated March 23, 1875; application filed February 9, 1875.

*To all whom it may concern:*

Be it known that I, A. W. SLAYTON, of Tecumseh, in the county of Lenawee and State of Michigan, have invented certain new and useful Improvements in Cutter-Heads; and I do hereby declare that the following is a full, clear, and exact description thereof, reference being had to the accompanying drawings, and to the letters of reference marked thereon, which form part of this specification.

The nature of my invention consists in the construction and arrangement of a matcher-head for tonguing and grooving (jointing) lumber, as will be hereinafter more fully set forth.

In order to enable others skilled in the art to which my invention appertains to make and use the same, I will now proceed to describe its construction and operation, referring to the annexed drawing, in which—

Figure 1:
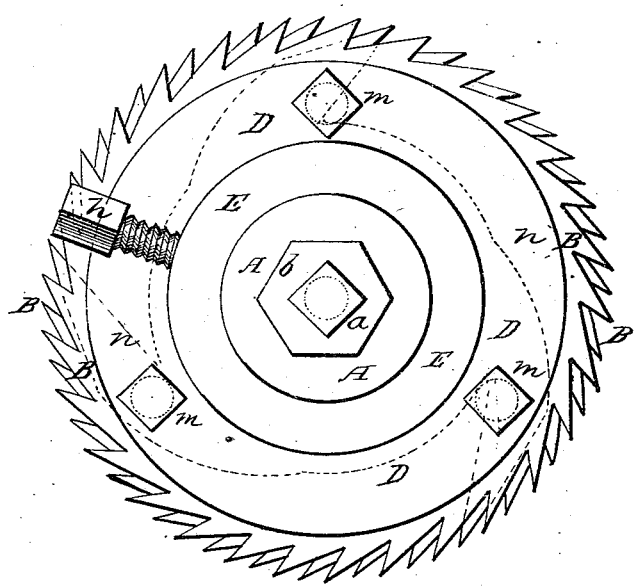
Figure 2:
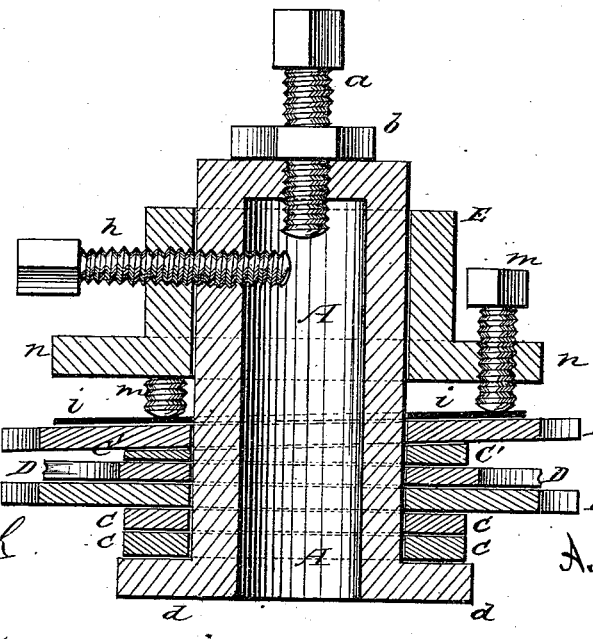

Figure 1 is a plan view of my matcher-head, and Fig. 2 is a longitudinal vertical section of the same.

A represents the ordinary cylindrical head placed on the upper end of the vertical shaft, and adjusted thereon by means of the set-screw $a$, with jam-nut $b$, in the usual manner. The lower end of the head A is provided with a circumferential flange, $d$. The knives for cutting the tongues and grooves consist simply of two circular saws, B B, slipped over the head A, with one or more washers, C, of iron, brass, wood, or other suitable material placed between the flange $d$ and the lower saw, and also between the saws. D represents a saw of smaller diameter having grooves $x$ in its teeth, as shown, for cutting the edge of the tongue convex or rounding, and this saw is placed between the saws B B. On the upper end of the head A is placed a collar or sleeve, E, fastened by means of a screw, $h$, which also fastens the head to the vertical shaft. Around the lower end of the sleeve E is a flange, $f$, through which are passed vertical set-screws $m$ for fastening the saws and washers, as shown, by pressing them down against the flange $d$. An annular disk or washer, $i$, is placed on top of the upper saw for the set-screws $m$ to bear against to prevent the springing of the saws. Between the saw D and the upper saw B is placed an inclined washer, $C'$, thereby bringing the upper saw in an inclined position, as it is pressed down on said inclined washer by the set-screws $m$. By the employment of saws instead of the usual two or three knives the lumber is not torn even when it is eaty or cross-grained. It takes less power to run the matcher-head. It will cut the lumber and make it parallel when it varies in width. The saws may be run either straight or tipped a little, as desired. Any thickness of saws may be used with any number of teeth on the saws.

Having thus fully described my invention, what I claim as new, and desire to secure by Letters Patent, is—

The combination of the flanged adjustable head A, saws B B D, washers C $C'$, flanged sleeve E, and set-screws $h$ and $m$ $m$, all constructed and arranged as and for the purposes herein set forth.

In testimony that I claim the foregoing as my own, I affix my signature in presence of two witnesses.

AUGUSTUS W. SLAYTON.

Witnesses:
S. H. MERRILL,
JAS. A. STACY.